C. H. AND W. F. WEYH.
BEET TOPPING MACHINE.
APPLICATION FILED APR. 4, 1921.

1,429,988.

Patented Sept. 26, 1922.
2 SHEETS—SHEET 1.

Inventor
Charles H. Weyh
William F. Weyh
by H. S. Johnson
Attorney.

C. H. AND W. F. WEYH.
BEET TOPPING MACHINE.
APPLICATION FILED APR. 4, 1921.
1,429,988.
Patented Sept. 26, 1922.
2 SHEETS—SHEET 2.
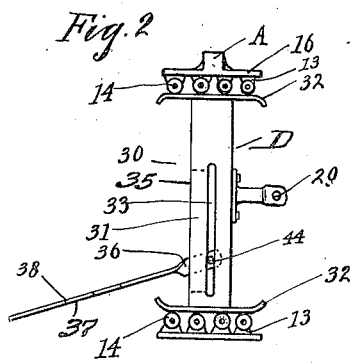
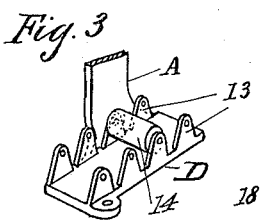
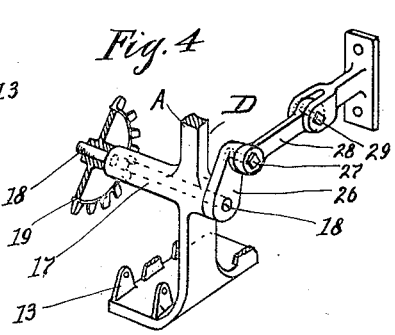
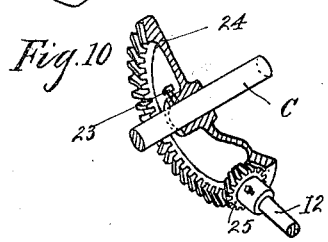
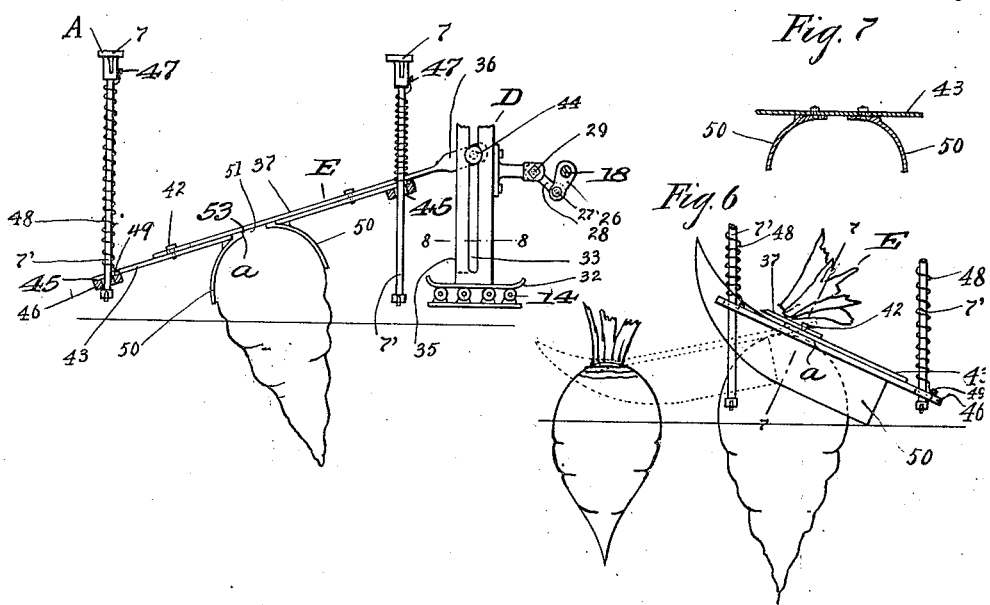
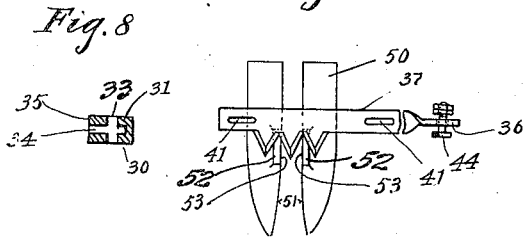
Inventor
Charles H. Weyh
William F. Weyh
by H. S. Johnson
Attorney Patented Sept. 26, 1922.

1,429,988

UNITED STATES PATENT OFFICE.

CHARLES H. WEYH AND WILLIAM F. WEYH, OF ST. PAUL, MINNESOTA.

BEET-TOPPING MACHINE.

Application filed April 4, 1921. Serial No. 458,518.

*To all whom it may concern:*

Be it known that we, CHARLES H. WEYH and WILLIAM F. WEYH, citizens of the United States, residing at St. Paul, in the county of Ramsey and State of Minnesota, have invented certain new and useful Improvements in Beet-Topping Machines, of which the following is a specification.

This invention relates to beet topping machines, and more particularly to means for cutting off the tops or stalks from the body of the beet, the main object of the invention being the provision of improved practical means for cutting the tops off of beets at a point close to the body thereof, certain novel features of construction being provided, whereby the sickle knife will travel over bodies of beets, growing in rows and protruding uneven distances above the ground, in such a manner, as to be guided by the body of the beet itself to place the knife in cutting position.

A further object of the invention is to provide topping means whereby the greens or stalk alone will be severed, as distinguished from devices, now in use, wherein the knife operates at a uniform distance from the ground resulting in great waste of beet material.

A still further object of the invention is the provision of a device of the class described, which is mounted on two supporting wheels and driven thereby and adapted to be drawn from a point forward of the wheels, so that no steering means are necessary.

Another object of the invention is the provision of a two wheeled topper wherein the sickle knife is located a distance forward of the wheels so that a slight rotary motion of the body of the machine will give increased lateral motion to the guiding means in advance of the knife whereby the latter is guided into engagement with the beet plant.

To this end, the invention consists in the construction, combination and arrangement of parts, hereinafter described and claimed.

In the drawings:

Figure 2 is a side view of the reciprocatory head for reciprocating the sickle knife.

Figure 3 is a fragmentary perspective view of the lower antifriction shoe for the reciprocatory head.

Figure 4 is a fragmentary perspective view of a part of the frame showing the pitman and crank mechanism therefor.

Figure 5 is a front view showing the sickle knife in tilted position.

Figure 6 is a side view showing the guide runners on the knife platform, traveling over a tall beet.

Figure 7 is a section on line 7—7 of Figure 6.

Figure 8 is a section on line 8—8 of Figure 5.

Figure 9 is a plan view of the guide runners showing the sickle knife in its relative normal position, and Figure 10 is a perspective view of the bevel gears on the axle and drive shaft.

Figure 1:
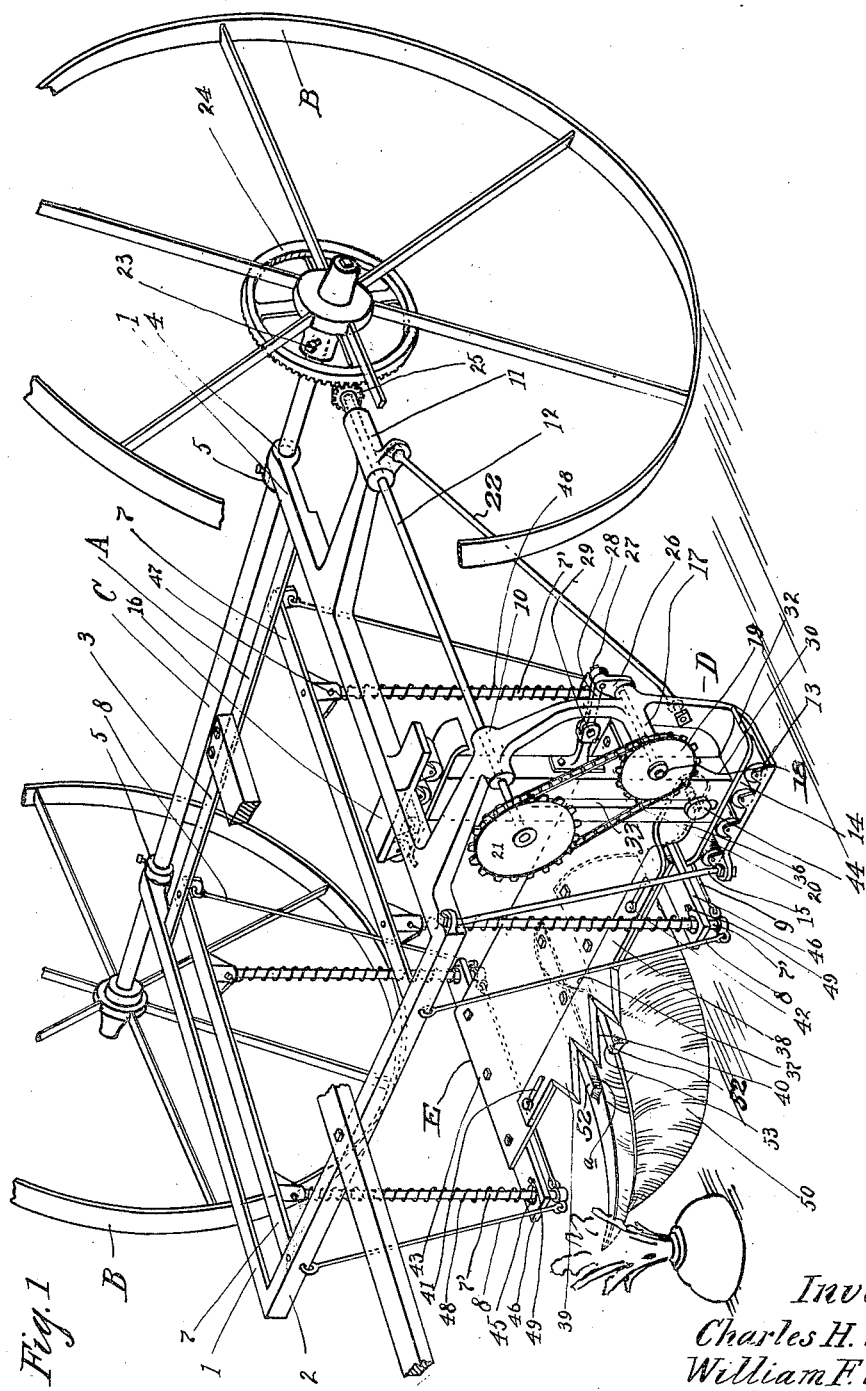
Figure 1 is a perspective view of the invention.

A designates the frame, B the supporting wheels therefor, C the axle for the wheels, D the knife reciprocating mechanism and E the floating guide and cutting mechanism.

The frame A comprises a rectangular top having side rails 1, and front and rear rails 2 and 3. The side rails extend beyond the rear rail 3, and support preferably rotatable in the hubs 4, the transverse axle C, the latter being held positioned laterally by the collars 5. Rigid on the axle are the wheels B. The frame further consists of bars 7 spaced from the side rails and parallel therewith, each bar having a pair of spaced vertical rods, 7' extending rigidly from the under side thereof, said rods extending to a position adjacent the ground. The rods are spaced respectively a distance from the front and rear rails 2 and 3, and are connected at their lower free ends by the stay rods 8 to the top of the frame, each pair of rods being also connected by a horizontal tie member 9. Obviously each pair of rods is thus held firmly braced and rigid to resist any rearwardly pulling force longitudinal of the machine.

The frame extends laterally outwardly at its stop from the side rail, and has widely spaced hubs 10 and 11 disposed longitudinally of the machine and aligned to rotatably support, at right angles to the axle C, the shaft 12. From the hub 10, the frame extends downwardly to a position adjacent the ground, and is formed thereat, with a horizontally disposed plate having rows of upstanding lugs 13 wherein are rotatably supported, so as to be axially horizontal and at right angles to the axle C, the rollers 14, said plate and rollers constituting a roller shoe. A rod 15 serves to brace the shoe on the frame. Directly above the roller shoe, and similarly constructed, but in inverted position is the upper roller shoe 16. Between the lower roller shoe and the hub 10 and parallel with the latter is the hub 17, rotatably supporting the crank shaft 18, the latter rigidly carrying at its forward end the sprocket wheel 19 having chain connection 20 with the sprocket wheel 21, the latter rigidly mounted on the shaft 12. A brace 22 extending from the lower portion of the frame to the hub 11 serves further to stiffen the frame structure. Secured to the axle C by means of the set screw 23 is the bevel gear 24, which latter meshes with the bevel pinion 25 on the shaft 12. Obviously when the wheel B is rotated, the crank shaft 18 will thereby be actuated. Rigid on the near end of the crank shaft is the crank arm 26, having pivotal connection 27 with the pitmen 28, the latter in turn extending laterally inwardly and having pivotal connection 29 with the reciprocatory head. This head comprises a high narrow body 31, having at its ends horizontally disposed skids 32, parallel with the peripheries of the row of rollers 14 of the shoes and engaging therewith, so that the head may ride with its skids on said rollers. When the shaft 19 is rotated the crank arm through the medium of the pitman will reciprocate the head transversely of the machine. The body 31 is cut through vertically at right angles to its skids by the slotted opening 33, the latter communicating with the slot 34 of equal length (Fig. 8) cut at right angles in the inner edge 35 of said body. Extending into the slot 34, is the pivot end 36 of the sickle knife 37 the latter comprising a long narrow plate 38, formed along its forward edge with a serrated reaper knife 39. The serrations are of usual shape having forwardly converging cutting edges 40. The plate 38 has longitudinally disposed slotted holes 41, adapted to slidably receive the headed studs 42, which latter are suitably secured in the platform 43, at a position to permit the cutting teeth of the knife to overhang the front edge of the platform and in a manner to permit the knife to slide on said platform. Extending through the slotted opening 33 and the pivot end of the knife and secured in the latter, is the pivot pin 44, the latter adapted to freely slide vertically in said slotted opening. Thus, when the head 30 is reciprocated the knife 37 will be caused to vibrate back and forth on the platform, even though the latter be raised and lowered by sliding the pivot pin 44 up and down. Extending longitudinally of the machine, and having relatively large openings 45, one at each end, to loosely slide on the rods 7' are the batons 46 to which latter the platform 43 is firmly secured. Secured to its top by means of the set screw 47, each rod 7', is loosely surrounded by a coil spring 48, said spring being secured at its lower end to the baton 46 by means of the set screw 49. These four springs are proportioned to normally hold resiliently suspended, the platform 43 and the parts attached thereto at approximately the position indicated in Figure 1.

Secured to the under side of the platform, and extending a considerable distance beyond the forward edge thereof, and positioned midway between the rods 7', are the guide runners 50. These runners extend forward of the knife 37, and are spaced to form a jaw 51 sufficiently wide to receive the stalk of the beet plant, the sides of the jaw diverging outwardly to render it wider at its forward end whereby to facilitate the entry of the plant. Each runner is curved upwardly and forwardly after the manner of an ordinary sled runner, and is curved longitudinally, throughout its length, upwardly and centerward toward the gap 51, (see Fig. 7). Thus, the two runners form a corridor with an arcuate ceiling, having a central longitudinal slit corresponding to the gap 51.

In operation, the plant enters the gap, as the device is drawn forward, the smooth arcuate undersurface of the runners engaging the rounder body of the protruding beet and frictionally sliding over same, until the reciprocating knife is engaged.

To correspond to the finger-bar of an ordinary reaper, the lugs 52 on the top of the runners are provided. These lugs are flush with the edge of the gap 51, the inner edges 53 of the lugs being ground to serve as cutting edges, whereby in cooperation with the cutting edges 40 of the knife 37, the stalks will be severed from the body of the beet. Thus the arcuate runners serve as a guide or gauge, inasmuch as the distance between the point a on the underside of the runner and the cutting edge 53 of the lug 52 is constant, and thereby gauges the distance of the cut above the beet body. As shown in dotted lines, Fig. 6, the platform may tilt to accommodate varying heights of beets, the openings 45 being sufficiently large to permit this. As the springs hold the platform resiliently suspended it will require very little upward pressure to raise it, thereby preserving the beet from mutilation.

We claim:

1. A beet topping machine of the class described, comprising a wheeled frame, a reciprocatory head mounted to reciprocate in a direction transversely of the frame, mechanism operatively connecting said reciprocatory head with the wheels to be actuated thereby responsive to the forward movement of the machine, and a normally horizontal beet topping element having reciprocatory cutting means having operative vertically slidable connection with said reciprocatory head, said element being resiliently suspended from the frame so as to yield to be moved out of its normal position when engaging the body of a beet.

2. A beet topping machine of the class described, comprising a wheeled frame, a reciprocatory head mounted to reciprocate in a direction transversely of the machine, mechanism operatively connecting said reciprocatory head with the wheels to be actuated thereby responsive to a bodily movement of the machine, a normally horizontal cutting device including cutting means having a vertically slidable pivotal connection with said reciprocatory head said device being mounted on the frame so as to be oscillatory, and a beet engaging guide member below and forward of said cutting means for the purpose set forth.

3. A beet topping machine, comprising a wheeled frame, a support resiliently suspended from the frame so as to yield to be oscillatory, a forwardly directed vibratory reaper knife on said support, mechanism operatively connecting the wheels and knife to vibrate the latter, and a pair of longitudinally disposed spaced runners below and forward of said vibratory knife.

4. A beet topping machine, comprising a wheeled frame, a reciprocatory head forward of the wheels and mounted to reciprocate transversely of the frame, mechanism operatively connecting said reciprocatory head with the wheels to be reciprocated responsive to the movement of the latter, a transversely disposed vibratory reaper knife resiliently suspended between said wheels and forward thereof so as to be movable vertically, said knife having operative connection with said vibratory head, and means in connection with the knife extending forward of the latter and adapted to engage the body of the beet to control the cutting position of the knife thereon.

5. A beet topping machine, comprising a wheeled frame, a normally horizontal reaper knife support constructed to drag on the ground forward of the wheels and between the latter, a forwardly directed reaper knife mounted on said support to reciprocate laterally thereon, reciprocatory mechanism operatively connecting said reaper knife and said wheels to actuate said knife when the wheels are rotated, and means for connecting said reaper knife support to the frame, said means including springs constantly pulling upwardly under stress said knife support.

In testimony whereof we affix our signatures in presence of a witness.

CHARLES H. WEYH.
WILLIAM F. WEYH.

Witness:
GEORGE VOELKER.